United States Patent
Takahashi

(10) Patent No.: US 8,737,256 B2
(45) Date of Patent: May 27, 2014

(54) BAND CONTROL SYSTEM FOR A DIGITAL SUBSCRIBER NETWORK AND BAND CONTROL METHOD THEREFOR

(71) Applicant: Juniper Networks, Inc., Sunnyvale, CA (US)

(72) Inventor: Takemasa Takahashi, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/780,410

(22) Filed: Feb. 28, 2013

(65) Prior Publication Data

US 2013/0170381 A1 Jul. 4, 2013

Related U.S. Application Data

(63) Continuation of application No. 13/046,241, filed on Mar. 11, 2011, now Pat. No. 8,396,008, which is a continuation of application No. 11/754,059, filed on May 25, 2007, now Pat. No. 7,929,454, which is a continuation of application No. 10/173,813, filed on Jun. 19, 2002, now Pat. No. 7,239,647.

(30) Foreign Application Priority Data

Jun. 20, 2001 (JP) .................................. 2001-185699

(51) Int. Cl.
*H04L 12/26* (2006.01)

(52) U.S. Cl.
USPC ........................................................ 370/252

(58) Field of Classification Search
None
See application file for complete search history.

(56) References Cited

U.S. PATENT DOCUMENTS

| 6,212,227 | B1 | | 4/2001 | Ko et al. |
| 6,404,774 | B1 | * | 6/2002 | Jenness ......................... 370/465 |
| 6,424,674 | B1 | * | 7/2002 | Linz et al. ..................... 375/220 |
| 6,498,806 | B1 | * | 12/2002 | Davis ............................ 375/222 |
| 6,546,090 | B1 | | 4/2003 | Bremer et al. |

(Continued)

FOREIGN PATENT DOCUMENTS

| JP | H11-275083 A | 10/1999 |
| JP | 11-331192 A | 11/1999 |

(Continued)

OTHER PUBLICATIONS

Kawahara et al., "Performance of TCP/IP over ATM over an ADSL", IEICE Transactions on Communications, vol. E83-B, No. 2, pp. 140-154, 2000.

*Primary Examiner* — Raj Jain
(74) *Attorney, Agent, or Firm* — Harrity & Harrity, LLP

(57) ABSTRACT

A band control system of the present invention is applicable to a digital subscriber line network in which a first apparatus and a second apparatus situated at a subscriber station and a center, respectively, are interconnected by a metallic cable for interchanging at least a digital data signal with each other. The band control system includes a commanding device included in one of the first and said second apparatuses for monitoring the receipt of ATM (Asynchronous Transfer Mode) cells from the other apparatus and sending, based on the result of monitoring, a band variation command to the other apparatus to thereby cause it to vary a band by using a frequency band not used for signal transfer. A band varying device is included in the other apparatus for receiving the band variation command and varying the band in accordance with the command.

20 Claims, 10 Drawing Sheets

(56) References Cited

U.S. PATENT DOCUMENTS

| | | |
|---|---|---|
| 6,963,538 B1 | 11/2005 | Giroux et al. |
| 7,239,647 B2 | 7/2007 | Takahashi |
| 7,315,571 B1 | 1/2008 | Heidari et al. |
| 7,929,454 B2 | 4/2011 | Takahashi |
| 2003/0016794 A1* | 1/2003 | Brothers .................... 379/90.01 |
| 2007/0237178 A1 | 10/2007 | Takahashi |
| 2011/0164497 A1 | 7/2011 | Takahashi |

FOREIGN PATENT DOCUMENTS

| | | |
|---|---|---|
| JP | 11-331238 A | 11/1999 |
| JP | H11-308352 A | 11/1999 |
| JP | 2000-184061 A | 6/2000 |
| JP | 2001-111620 A | 4/2001 |

* cited by examiner

BAND CONTROL SYSTEM FOR A DIGITAL SUBSCRIBER NETWORK AND BAND CONTROL METHOD THEREFOR

RELATED APPLICATIONS

This application is a continuation of U.S. patent application Ser. No. 13/046,241, filed Mar. 11, 2011, which is a continuation of U.S. patent application Ser. No. 11/754,059, filed May 25, 2007 (now U.S. Pat. No. 7,929,454), which is a continuation of U.S. patent application Ser. No. 10/173,813, filed Jun. 19, 2002 (now U.S. Pat. No. 7,239,647). The contents of all these applications are incorporated herein by reference.

BACKGROUND OF THE INVENTION

1. Field of the Invention

The present invention relates to a band control system for a digital subscriber network and a band control method therefor. More particularly, the present invention relates to a band control system implementing flexible control and efficient use of a band between IADs (Integrated Access Devices) and a DSLAM (Digital Subscriber Line Access Multiplexer) situated at subscriber stations and a center, respectively, and a control method therefor.

2. Description of the Background Art

A VoDSL (Voice over Digital Subscriber Line) network using an ATM (Asynchronous Transfer Mode) communication system and a DSL technology provides a transfer path for multimedia communication using voice, data and image. DSL technologies implement high-speed digital transfer over metallic cables, i.e., existing telephone subscriber lines.

A problem with the conventional DSL technologies is that the transfer rate is dependent on the quality of metallic cables and transfer distance and therefore indefinite despite a preselected transfer rate. Consequently, a communication band statistically set beforehand brings about the congestion of ATM cells and thereby causes some users to be blocked. It is therefore necessary to dynamically control band assignment in order to obviate the congestion of ATM cells.

Japanese Patent Laid-Open Publication No. 2000-184061, for example, discloses a technology for dynamically controlling band assignment in a DSL communication system. It has been customary with conventional technologies, including the above technology, to send band control information indicative of the variation of a communication band by using special ATM cells, e.g., RM (Resource Management) cells. This, however, presses the communication band and thereby makes the use of the frequency band uneconomical when such special ATM cells are used to dynamically guarantee the band during communication.

Technologies relating to the present invention are also disclosed in, e.g., Japanese Patent Laid-Open Publication No. 11-331192.

SUMMARY OF THE INVENTION

It is an object of the present invention to provide a band control system for a digital subscriber line network capable of solving the problem stated above and a band control system therefor.

A band control system of the present invention is applicable to a digital subscriber line network in which a first apparatus and a second apparatus situated at a subscriber station and a center, respectively, are interconnected by a metallic cable for interchanging at least a digital data signal with each other. The band control system includes a commanding device included in one of the first and said second apparatuses for monitoring the receipt of ATM (Asynchronous Transfer Mode) cells from the other apparatus and sending, based on the result of monitoring, a band variation command to the other apparatus to thereby cause it to vary a band by using a frequency band not used for signal transfer. A band varying device is included in the other apparatus for receiving the band variation command and varying the band in accordance with the command.

A band control method for the band control system is also disclosed.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Briefly, in a VoDSL network that allows a plurality of digital voice signals and a plurality of digital data signals to be interchanged via metallic wires, or existing telephone subscriber lines, by use of a DSL technology, the present invention provides a band control system realizing flexible control and efficient use of communication band between IADs and a DSLAM situated at subscriber stations and a center, respectively, and a band control method therefor.

Further, the system and method of the present invention measure the amount of received ATM cells or the ratio of discarded ATM cells VC (Virtual Channel) by VC and then send a band variation command to any one of the IADs by using a frequency band not used for signal transfer in the VoDSL network, e.g., a frequency band lower than 4 kHz inclusive. This dynamically optimizes the frequency band for thereby promoting efficient operation of the VoDSL network.

Figure 1:
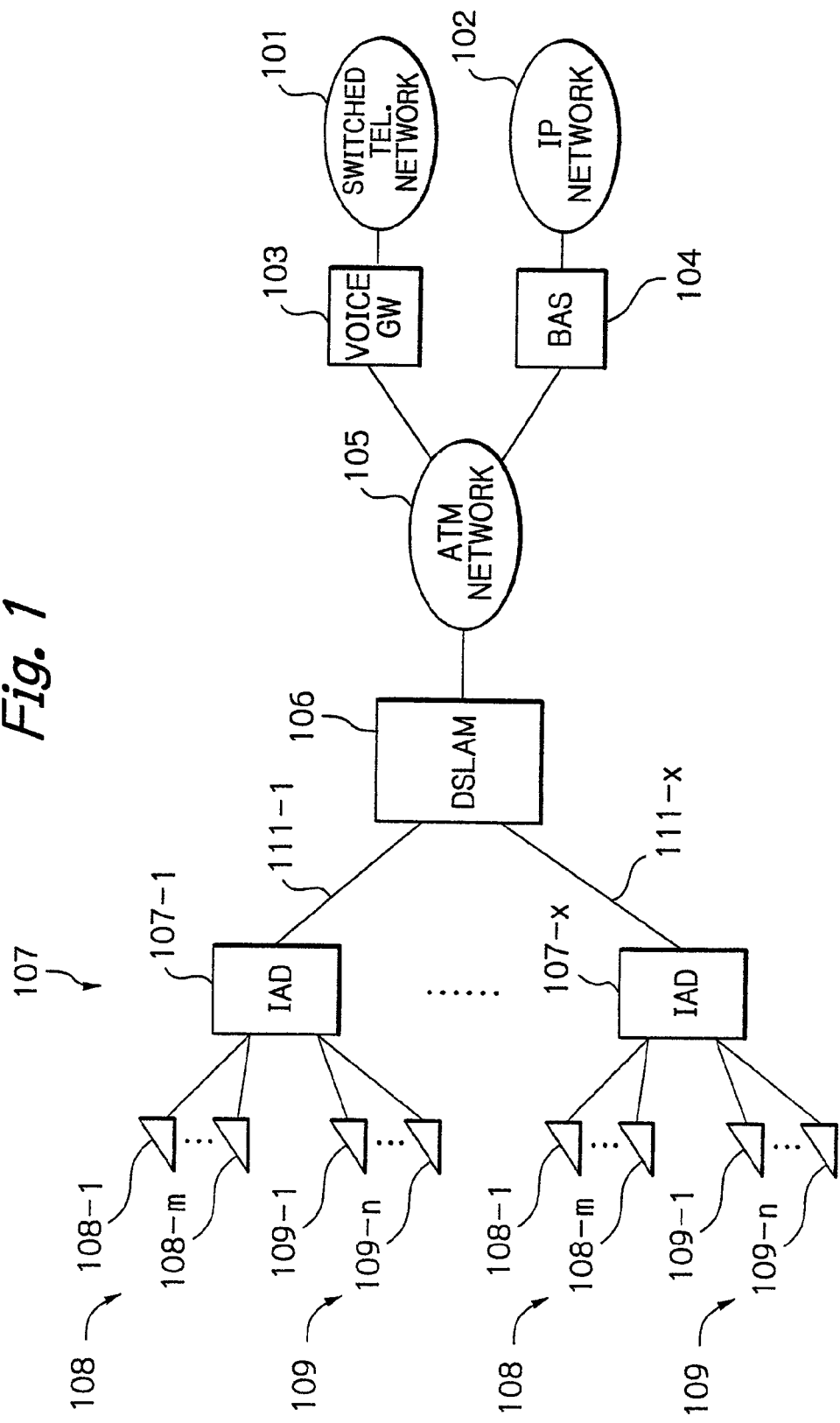
FIG. 1 is a schematic block diagram showing a specific band control system in accordance with the present invention.

Referring to FIG. 1 of the drawings, a specific configuration of a band control system in accordance with the present invention. As shown, the band control system includes a public switched telephone network 101, an IP (Internet Protocol) network 102, a voice GW (Gate Way) 103, a BAS (Broadband Access Server) 104, an ATM network 105, a DSLAM 106, IADs 107, telephones 108, and personal computers or similar data terminals 109. A band control method in accordance with the present invention is applied to the DSLAM 106 and IADs 107. The telephones 108 and data terminals 109 are assigned to voice telephone services and Internet access and other data communication services, respectively.

More specifically, the telephones 108-1 through 108-*m* (m being a positive integer) and data terminals 109-1 through 1-9-*n* (n being a positive integer) each are accommodated in one of the IADs 107-1 through 107-*x* (x being a positive integer). The IADs 107 each are connected to the DSLAM 106 by one of metallic cables 111-1 through 111-*x*. The voice GW 103 is existing network equipment that repeats, when any one of the telephones 108 effects a voice telephone service, all protocols necessary for connecting the ATM network 105 and switched telephone network 101. Likewise, the BAS 104 is existing network equipment that repeats, when any one of the data terminals 109 effects an Internet access or similar data communication service, all protocols necessary for connecting the ATM network 105 and IP network 102.

Figure 2:
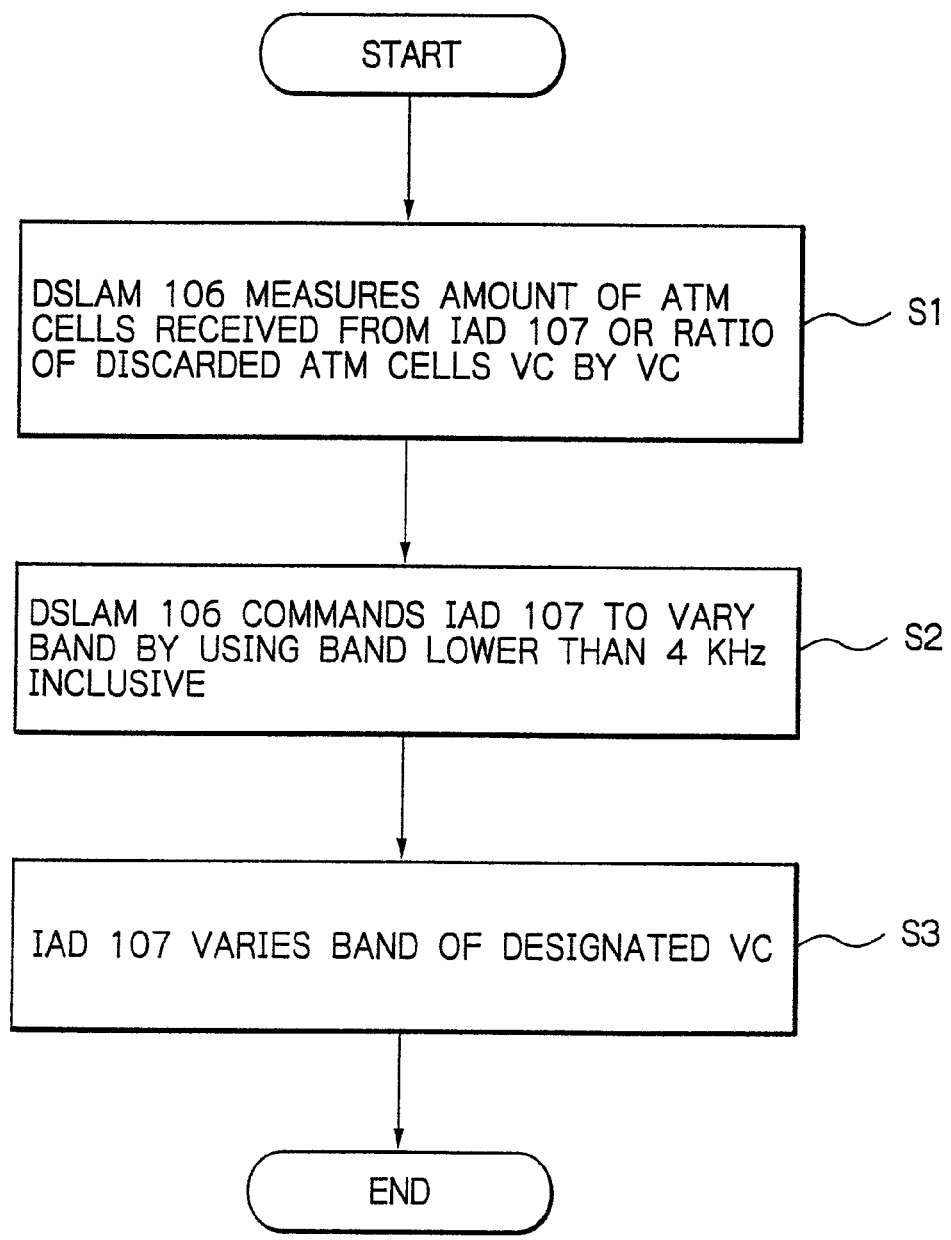
FIG. 2 is a flowchart demonstrating the operation of the band control system shown in FIG. 1.

FIG. 2 demonstrates the operation of the band control system in accordance with the present invention. As shown, the DSLAM 106 measures the amount of ATM cells received from each IAD 107 or the ratio of discarded ATM cells VC by VC (step S1). The DSLAM 106 then commands, based on the result of measurement, the IAD 107 to vary the frequency band by using a frequency band not newly occupied by signal transfer in a VoDSL network, e.g., a frequency band lower than 4 kHz inclusive (step S2). In response, the IAD 107 varies the frequency band of a VC newly designated by the DSLAM 106 (step S3).

As stated above, the band control system in accordance with the present invention sends band control information to the IAD 107 not by using conventional special ATM cells, but by using a frequency band not occupied by signal transfer. The system therefore solves the previously stated problem particular to the conventional DSL communication system. It is therefore possible to dynamically maintain an optimal communication band between each IAD 107 and the DSLAM 106 for thereby promoting efficient use of the VoDSL network.

A first embodiment of the present invention also practicable with the configuration shown in FIG. 1 will be described hereinafter. The description on the individual blocks shown in FIG. 1 will not be repeatedly made in order to avoid redundancy. The voice GW 103 has the previously stated function as existing network equipment. More specifically, the voice GW 103 communicates with the IADs 107 with a signaling procedure using, e.g., an LES (Lop emulation Service). Also, the voice GW 103 communicates with the switched telephone network 101 with a signaling procedure using an FR-303 or similar time-division communication system.

The BAS 104 also has the function stated earlier as existing network equipment. More specifically, the BAS 104 communicates with the ATM network 105 with a signaling system using, e.g., a PPPoA (Point to Point Protocol over ATM) system. Also, the BAS 104 interchanges IP packets with the IP network 101 by using an IP signaling system.

A specific configuration of the DSLAM 106 will be described with reference to FIG. 3. As shown, the DSLAM 106 includes an ATM network interface 201, an ATM cell multiplexer/demultiplexer 202, x (x being a positive integer) ATM cell queues 203 (203-1 through 203-*x*) and x center DSL modems 204 (204-1 through 204-*x*) as conventional. In the illustrative embodiment, the DSLAM 106 additionally includes x band control information transmitters 205 (205-1 through 205-*x*) and x signal couplers 206 (206-1 through 206-*x*).

Each band control information transmitter 205 measures, VC by VC, the amount of ATM cells received from the associated IAD 107 or the ratio of discarded ATM cells. Assume that either the amount of received ATM cells or the ratio of discarded ATM cells exceeds an allowable range implementing preselected communication quality. Then, to command the IAD 107 to vary the communication band assigned to the corresponding VC, the transmitter 205 modulates a band control information signal to a conventional modem signal or similar signal that can be sent in a frequency band lower than 4 kHz inclusive. The modulated signal is fed to the associated signal coupler 206.

The signal coupler 206 couples a DSL signal received from the center DSL modem 204 and the band control information signal received from the band control information transmitter 205 to thereby produce a signal, which will be described with reference to FIG. 4 later. This signal is sent from the signal coupler 206 to the IAD 107 connected to the DSLAM 106 by the associated metallic cable 111. In addition, when the signal coupler 206 receives a DSL signal from the IAD 107, the signal coupler 206 simply transfers the DSL signal to the center DSL modem 203 without any processing.

Figure 4:
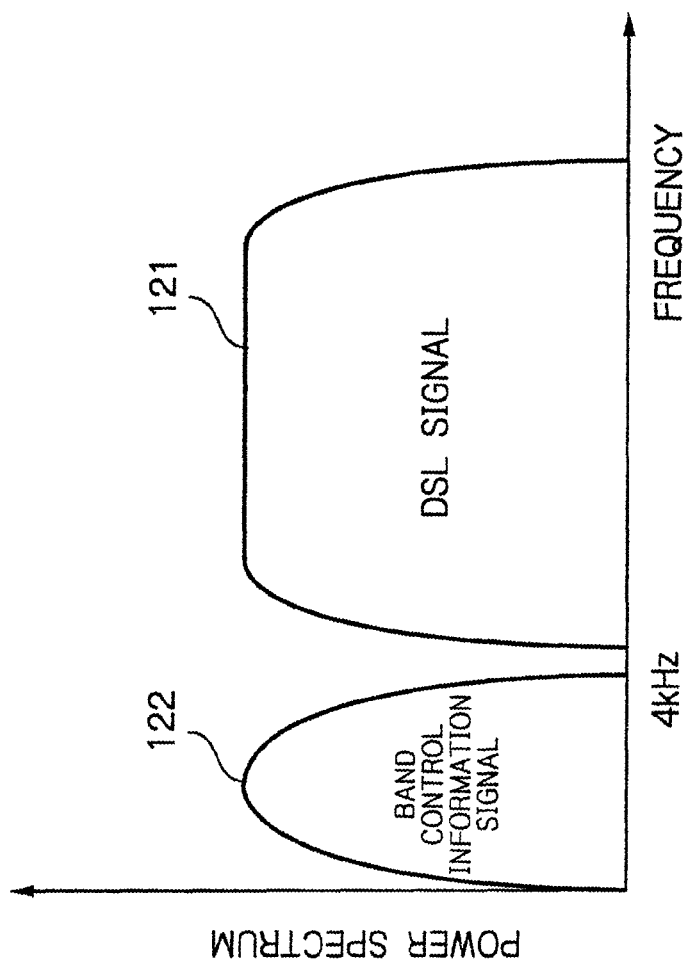
FIG. 4 shows a specific frequency characteristic of signals to be interchanged between IADS shown in FIG. 1 and the DSLAM.

FIG. 4 shows specific frequency bands assigned to the signals to be interchanged between each IAD 107 and DSLAM 106. As shown, the signals consist of a DSL signal or main information signal 121 and a band control information signal 122. A frequency band higher than 4 kHz and a frequency band lower than 4 kHz inclusive are assigned to the DSL signal 121 and band control information signal 122, respectively, by way of example.

Figure 5:
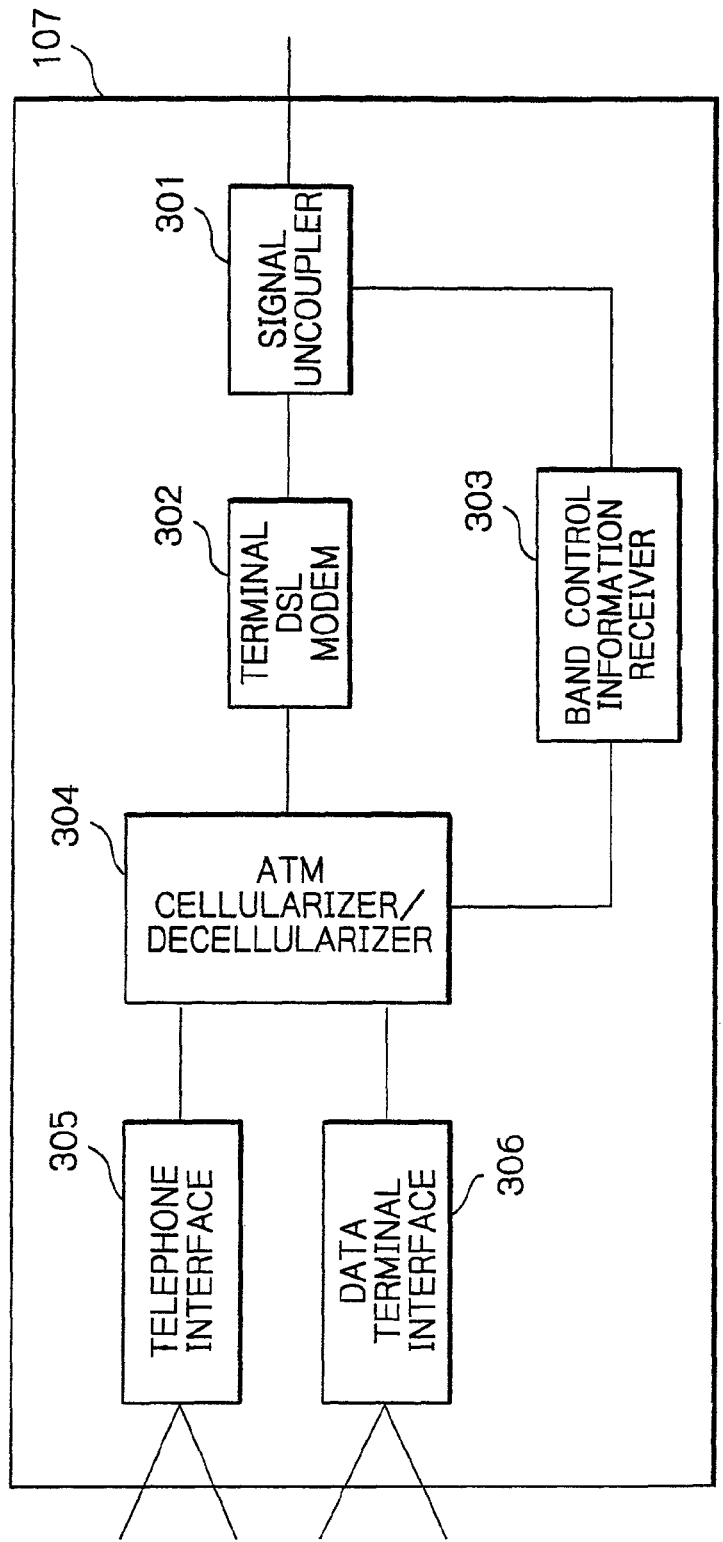
FIG. 5 is a schematic block diagram showing a specific configuration of each IAD.

FIG. 5 shows a specific configuration of each IAD 107. As shown, the IAD 107 includes a terminal DSL modem 302, an ATM cellularizer/decellularizer 304, a telephone interface 305, and a data terminal interface 306 as conventional. In the illustrative embodiment, the IAD 107 additionally includes a signal uncoupler 301, and a band control information receiver 303.

The conventional telephone interface 305 allows various kinds of telephone terminals 108 available for voice telephone services to be accommodated in the IAD 107. For this purpose, the telephone interface 305 functions to terminate POTS (Plain Old Telephone Service) interfaces assigned to traditional analog telephones and S/T point interfaces assigned to ISDN (Integrated Services Digital Network) terminal adapters.

Likewise, the conventional data terminal interface 306 allows various kinds of data terminals 109 available for internet access and other data communication services to be accommodated in the IAD 107. For this purpose, the data terminal interface 306 functions to terminate a USB (Universal Serial Bus), 10/100 Base-T or similar interface.

The signal uncoupler 301 separates the signals shown in FIG. 4 and received from the DSLAM 106 via the metallic cable 111 into the DSL signal 121 and frequency control information signal 122 that lies in the frequency band lower than 4 kHz inclusive. The DSL signal 121 and band control information signal 122 separated from each other are input to the terminal DSL modem 302 and band control information receiver 303, respectively. On the other hand, when a DSL signal is input from the terminal DSL modem 302 to the signal uncoupler 301, the signal uncoupler 301 simply transfers the DSL signal to the metallic cable 111 without any processing.

The band control information receiver 303 separates the band control information sent from the DSLAM 106 from the band control information signal 122 and analyzes the information. The receiver 303 then causes the ATM cellularizer/decellularizer 304 to vary the communication band assigned to the corresponding VC directed toward the DSLAM 106.

Specific operations of the illustrative embodiment will be described hereinafter. First, how signals flow when the telephone 108 accommodated in any one of the IADs 107 communicates with the public switched telephone network 101 by using a voice telephone service will be described.

Referring again to FIG. 1, as for the flow of signals from the telephone network 101 toward the telephone 108, a digital voice signal based on the time-division communication system is sent from the telephone network 101 to the voice GM 103 and transformed to ATM cells thereby. The cellularized digital voice signal is sent from the voice GW 103 to the DSLAM 106 via the ATM network 105. In the DSLAM 106, the ATM cell multiplexer/demultiplexer 202 delivers the cellularized digital voice signal to the center DSL modem 204 via one of the ATM cell queues 203 corresponding to the IAD 107. The office DSL modem 204 modulates the cellularized digital voice signal to a DSL signal and sends the DSL signal to the IAD 107 connected thereto by the metallic cable 111.

In the IAD 107 shown in FIG. 5, the terminal DSL modem 302 demodulates the DSL signal to thereby restore the original ATM cellularized voice signal. Subsequently, the ATM cellularizer/decellularizer 304 decellularizes the cellularized digital signal input from the terminal DSL modem 302. As a result, the decellularized digital voice signal is input to the telephone interface 305. The telephone interface 305 transforms the digital voice signal to a voice signal format matching with the telephone 108 and then sends the transformed voice signal to the telephone 108.

The flow of signals from the telephone 108 toward the telephone network 101 is identical with the flow described above except that the procedure is reversed in direction and will not be described specifically.

As stated above, the illustrative embodiment implements a bidirectional voice telephone service between the telephone 108 accommodated in the IAD 107 and the public switched telephone network 101.

Next, how signals flow when the data terminal 109 accommodated in any one of the IADs 107 effects a data communication service with the IP network 102 will be described hereinafter. Referring to FIG. 1, as for the flow of signals from the IP network 102 toward the data terminal 109, the IP network 102 sends an IP packet or an IP-packeted digital data signal to the BAS 104. The BAS 104 transforms the received IP packet or the IP-packeted digital data to an ATM cell. The ATM-cellularized IP packet or the IP-packeted digital data signal is sent to the DSLAM 106 via the ATM network 105. In the DSLAM 107, the multiplexer/demultiplexer 202, FIG. 3, delivers the ATM-cellularized IP packet or the IP-packeted digital signal data to the center DSL modem 204 via the ATM cell queue 203 corresponding to the IAD 107, which accommodates the data terminal 109. The center DSL modem 204 modulates the ATM-cellularized IP packet or the IP-packeted digital data signal to a DSL signal and sends the DSL signal to the IAD 107 via the metallic cable 111.

In the IAD 107, the terminal DSL modem 302, FIG. 5, demodulates the DSL signal to thereby restore the ATM-cellularized IP packet or the IP-packeted digital data signal and feeds it to the ATM cellularizer/decellularizer 304. The ATM cellularizer/decellularizer 304 decellularizes the ATM-cellularized IP packet or the IP-packeted digital data signal and inputs the resulting IP packet or the IP-packeted digital data signal to the data terminal interface 306. The data terminal interface 306 transforms the IP packet or the IP-packeted digital data signal to a format matching with the data terminal 109 and then sends the transformed IP packet or the transformed data signal to the data terminal 109.

The flow of signals from the data terminal 109 toward the IP network 102 is identical with the flow described above except that the procedure is reversed in direction and will not be described specifically.

As stated above, the illustrative embodiment implements a bidirectional data communication service between the data terminal 109 accommodated in the IAD 107 and the IF network 102.

Hereinafter will be described a band control procedure to be executed between each IAD 107 and the DSLAM 106. When a plurality of voice telephone services and a plurality of data communication services, both of which are bidirectional, are effected at the same time, importance should be attached to the communication quality of voice telephone services. This is because voice telephone services allow information to be interchanged between persons and therefore need real-time communication more than data communication services. It is therefore necessary to reduce propagation delays as far as possible. In addition, voice quality falls with an increase in the number of ATM cells discarded due to the failure of retransmission. On the other hand, data communication services should also be effected at high speed as possible for users' convenience.

Figure 3:
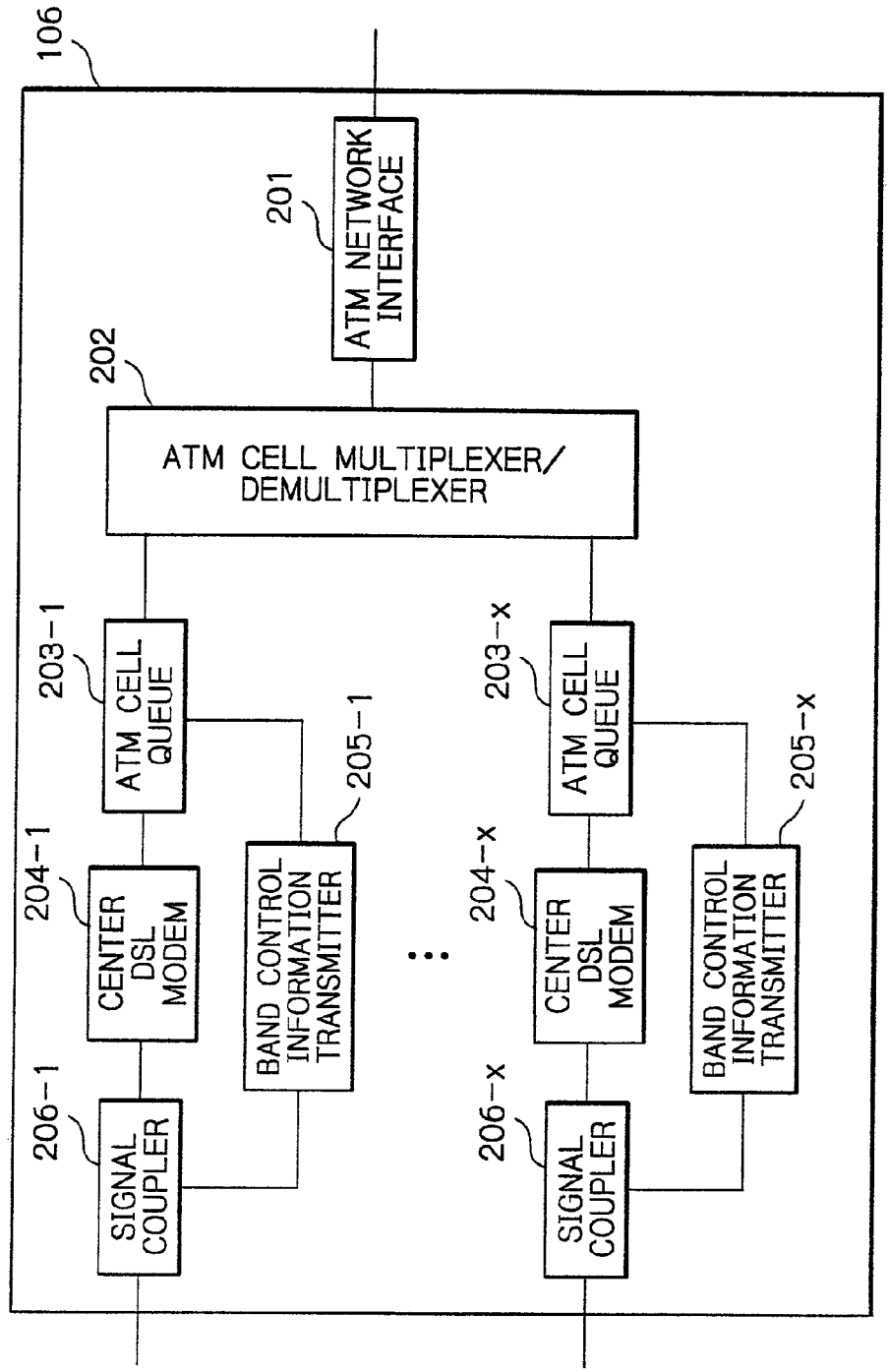
FIG. 3 is a schematic block diagram showing specific configuration of a DSLAM included in a first embodiment of the present invention.

In light of the above, in the illustrative embodiment, each band control information transmitter 205, FIG. 3, measures the amount of ATM cells received from the associated IAD 107 and present on the associated ATM cell queue 203 or the ratio of discarded ATM cells VC by VC (step S1, FIG. 2). Assume that the amount of ATM cells or the ratio of discarded ATM cells exceeds an allowable range assigned to the communication quality of a voice telephone service, which is determined by the provider of the VoDSL network beforehand. Then, the band control information transmitter 205 modulates the band control information signal 122, FIG. 4, to a conventional modem signal or similar signal that can be sent in the frequency band lower than 4 kHz inclusive. The band control information signal 122 is sent to the IAD 107 via the signal coupler 206 in order to command the IAD 107 to vary the frequency band of the VC on which the corresponding data communication service is held (step S2, FIG. 2).

In the IAD 107 shown in FIG. 5, the band control information signal 122 is routed through the signal uncoupler 301 to the band control information receiver 303. The receiver 303 separates the band control information signal 122 and analyzes the communication band designated by the DSLAM 106. The receiver 303 then controls the ATM cellularizer/decellularizer 304 in order to narrow the communication band assigned to the VC of the corresponding data communication service and directed toward the DSLAM 106 (step S3, FIG. 2).

On the other hand, assume that the amount of ATM cells or the ratio of discarded ATM cells decreases below the allowable range assigned to the communication quality of the voice telephone service. Then, the DSLAM 106 sends the band control information signal 122 to the IAD 107 in the previously stated manner. Again, the band control information receiver 303 separates the band control information signal 122 and analyzes the communication band designated by the DSLAM 106. The receiver 303 then controls the ATM cellularizer/decellularizer 304 in order to broaden the communication band assigned to the VC of the corresponding data communication service and directed toward the DSLAM 106.

A second embodiment of the present invention will be described hereinafter. The second embodiment is essentially similar to the first embodiment except that the DSLAM 106 is also configured to vary the frequency band of the VC designated by the IAD 107 for thereby further promoting efficient operation of the VoDSL network.

Figure 6:
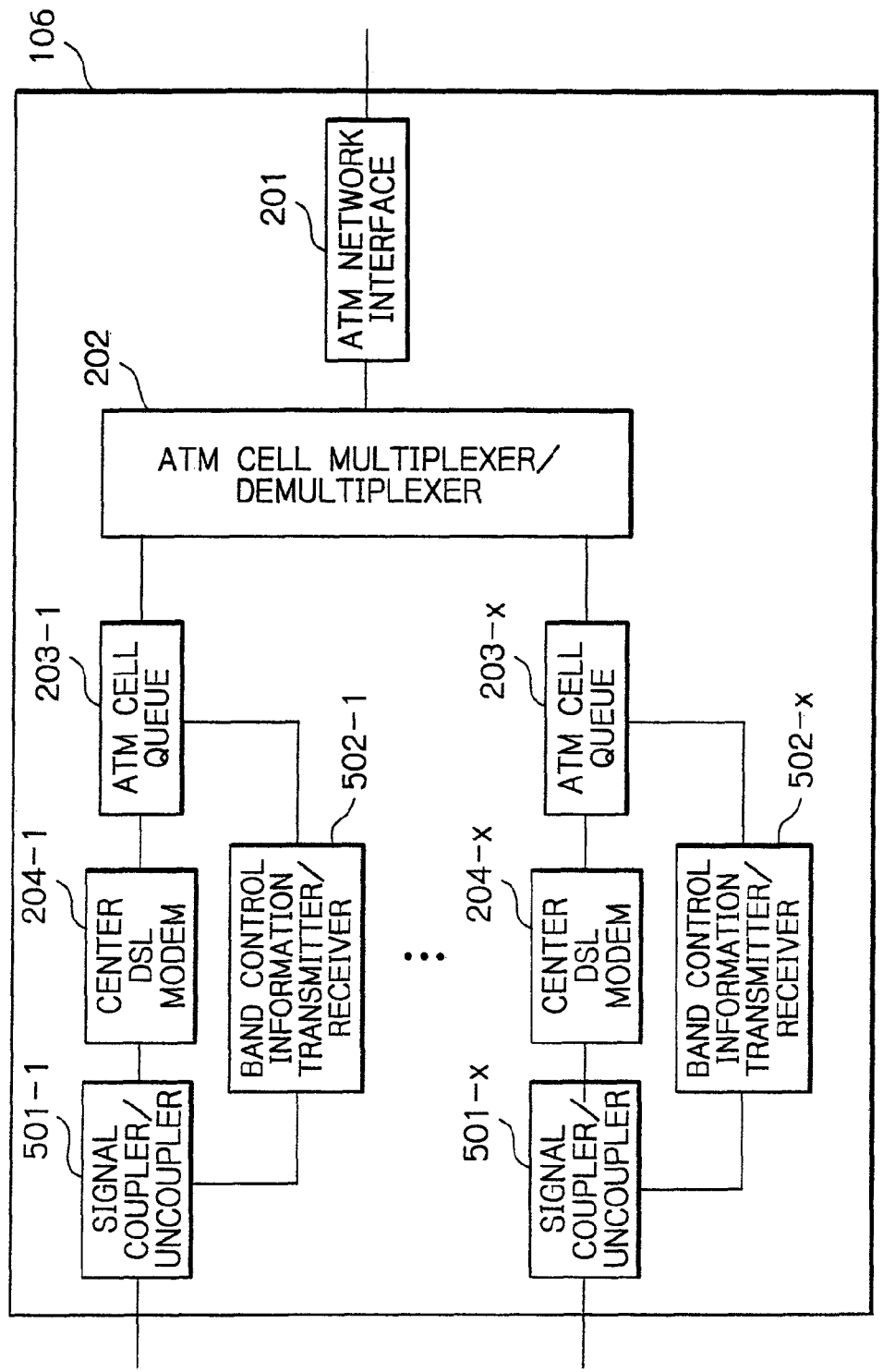
FIG. 6 is a schematic block diagram showing a specific configuration of a DSLAM included in a second embodiment of the present invention.

As shown in FIG. 6 specifically, the DSLAM 106 includes signal coupler/uncouplers 501 (501-1 through 501-x). Each signal coupler/uncoupler 501 has, in addition to the function of the signal coupler 206, FIG. 3, a function of separating the signal received from the IAD 107 into the DSL signal 121 and the signal 122 lying in the frequency bend lower then 4 kHz inclusive and feeding the signal 122 to a band control signal transmitter/receiver 502.

The band control signal transmitter/receiver 502 has the following function in addition to the function of the band control information transmitter 205, FIG. 3. The additional function is to separate the band control information signal sent from the IAD 107 from the signal 122 input from the signal coupler/uncoupler 501, analyze the signal 122, control the ATM cell queue 203 in accordance with the result of analysis, and vary the communication band assigned to the corresponding VC and directed toward the IAD 107.

Figure 7:
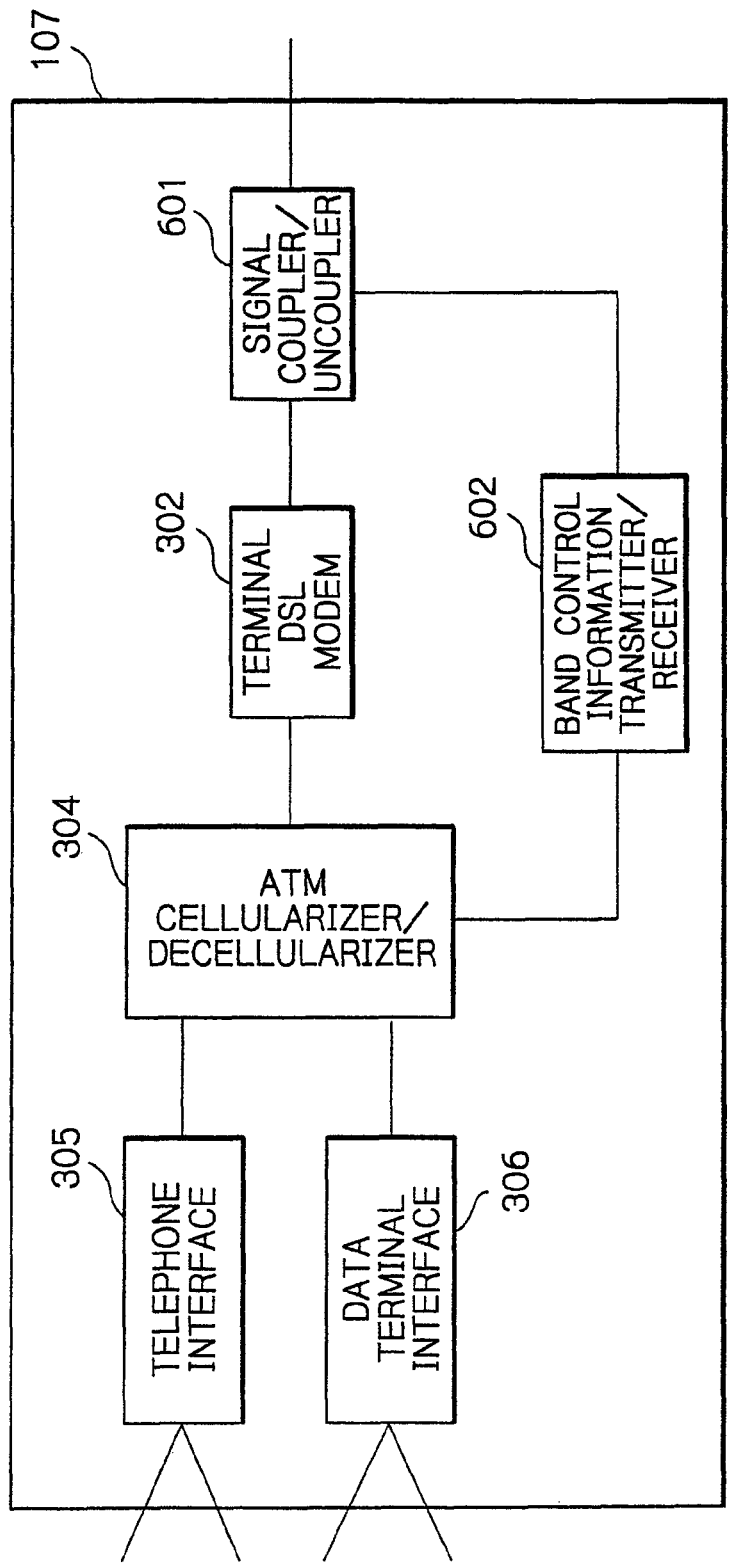
FIG. 7 is a schematic block diagram showing a specific configuration of an IAD included in the second embodiment.

As shown in FIG. 7 specifically, the IAD 107 includes a signal coupler/uncoupler 601 and a band control signal transmitter/receiver 602. The signal coupler/uncoupler 601 has, in addition to the function of the signal uncoupler 301, FIG. 5, a function of coupling the DSL signal 121 received from the terminal DSL modem 302 and the band control information signal 122 received from the band control information transmitter/receiver 602 and sending the resulting signal to the DSLAM 106.

The band control information signal transmitter/receiver 602 has the following function in addition to the function of the band control information receiver 303, FIG. 5. The additional function is to measure the amount of ATM cells received from the DSLAM 106 and input to the ATM cellularizer/decellularizer 304 or the ratio of discarded ATM cells VC by VC. When the amount of ATM cells or the ratio of discarded ATM cells increases above an allowable range assigned to communication quality, the band control information transmitter/receiver 602 modulates the band control information signal to a conventional modem signal or similar signal that can be sent in the frequency band lower than 4 kHz inclusive. The modulated signal is sent to the signal coupler/uncoupler 601 in order to command the signal coupler/uncoupler 601 to vary the communication band of the corresponding VC.

Figure 8:
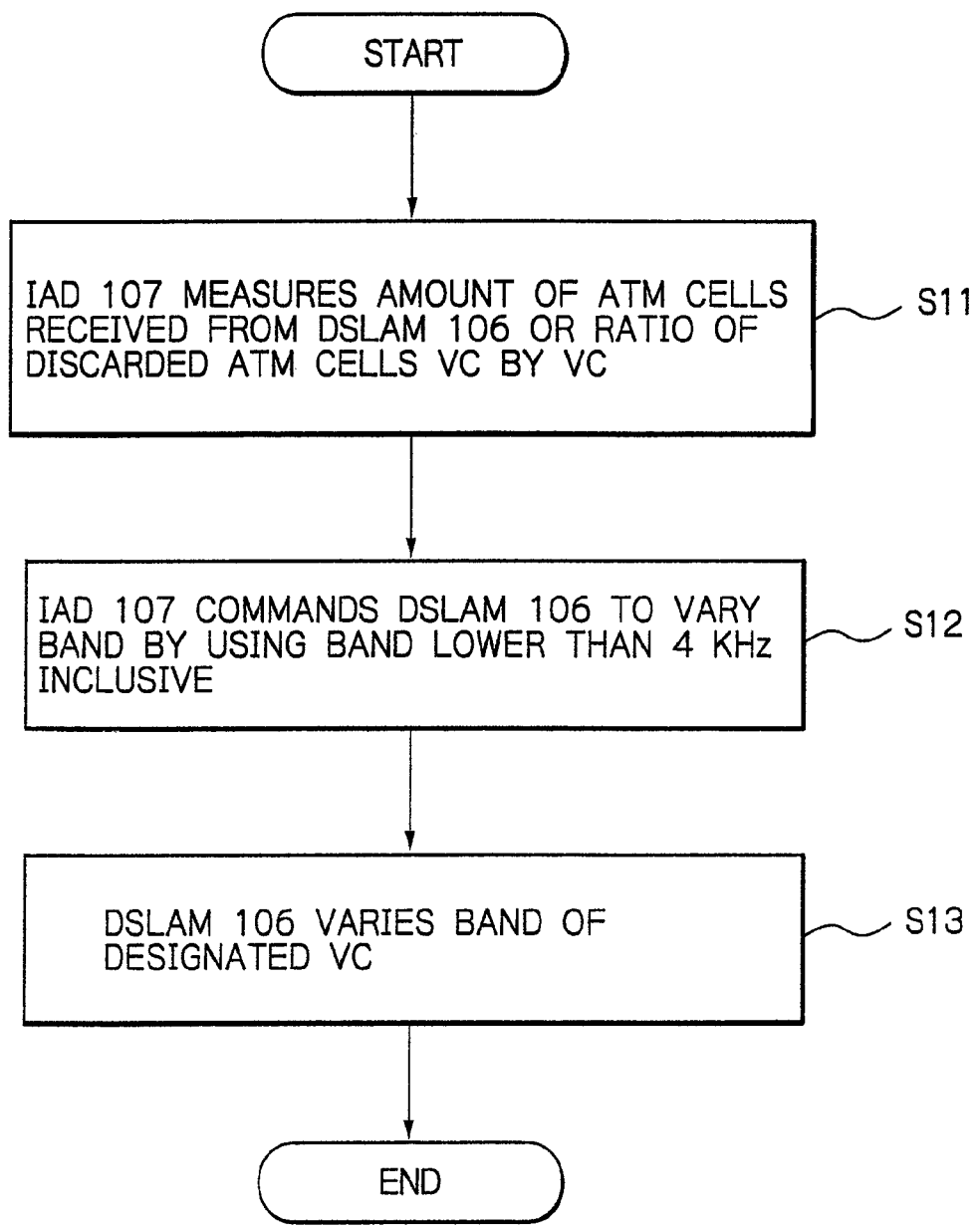
FIG. 8 is a flowchart demonstrating the operation of the second embodiment.

More specifically, as shown in FIG. 8, the IAD 107 measures the amount of ATM cells received from the DSLAM 106 or the ratio of discarded ATM cells VC by VC (step S11). The IAD 107 then commands the DSLAM 106 to vary the frequency band by using the band lower than 4 kHz inclusive (step S12). In response, the DSLAM 106 varies the frequency band of the VC designated by the IAD 107 (step S13).

As stated above, in the illustrative embodiment, the IAD 107 can command, based on the amount of ATM cells received from the DSLAM 106 or the ratio of discarded ATM cells, the DSLAM 106 to vary the communication band VC by VC. It follows that the DSLAM 106 can narrow or broaden the band of the VC designated by the IAD 107 accordingly.

Figure 9:
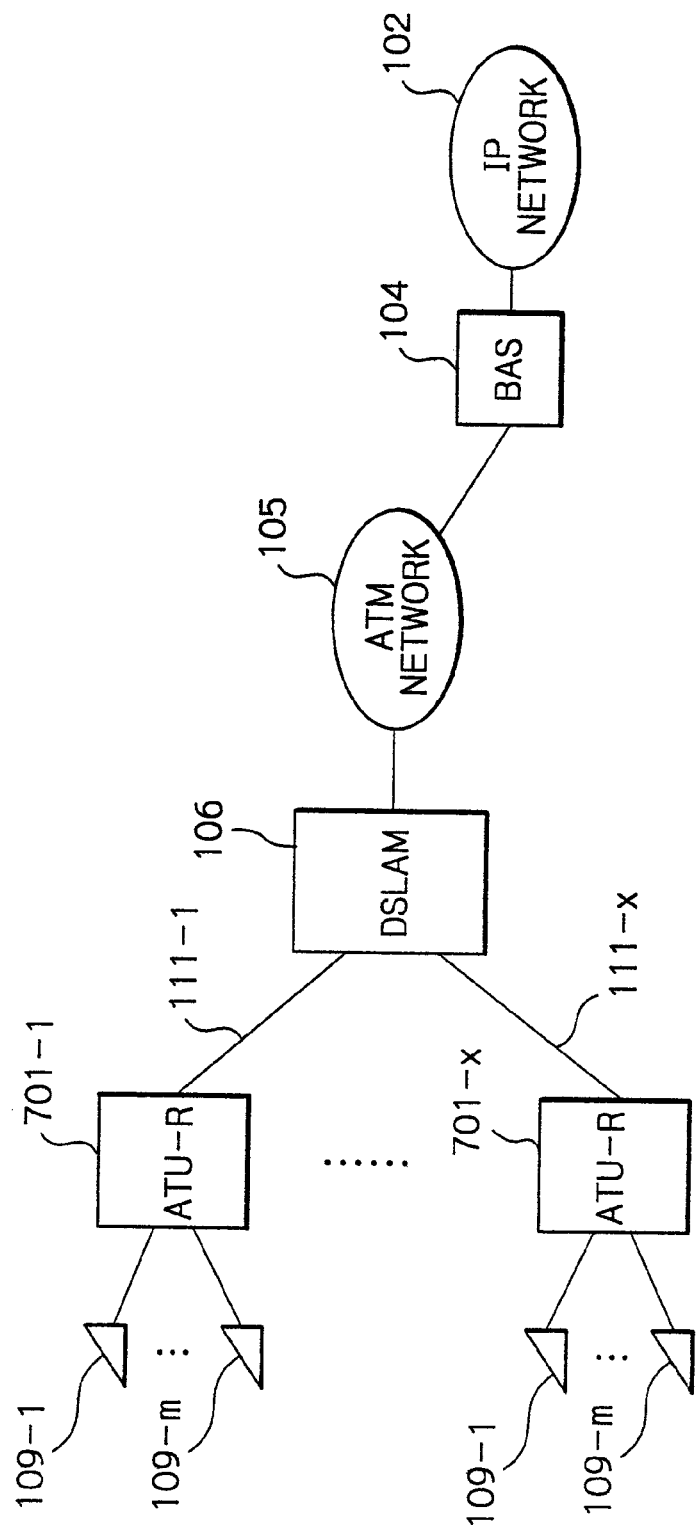
FIG. 9 is a schematic block diagram showing a third embodiment of the present invention.

A third embodiment of the present invention will be described hereinafter. This embodiment is applicable to a DSL network configured to promote high-speed Internet access and other data communication services by using metallic cables. A DSL network transforms only digital data signals to ATM cells and transfer the ATM cells via metallic cables. FIG. 9 shows a band control system representative of the third embodiment. As shown, the third embodiment includes x ATU-Rs 701 (701-1 through 701-x) in place of the IADs 107-1 through 107-x, FIG. 1. The x ATU-Rs 701 are connected to the DSLAM 106 by the metallic cables 111.

Figure 10:
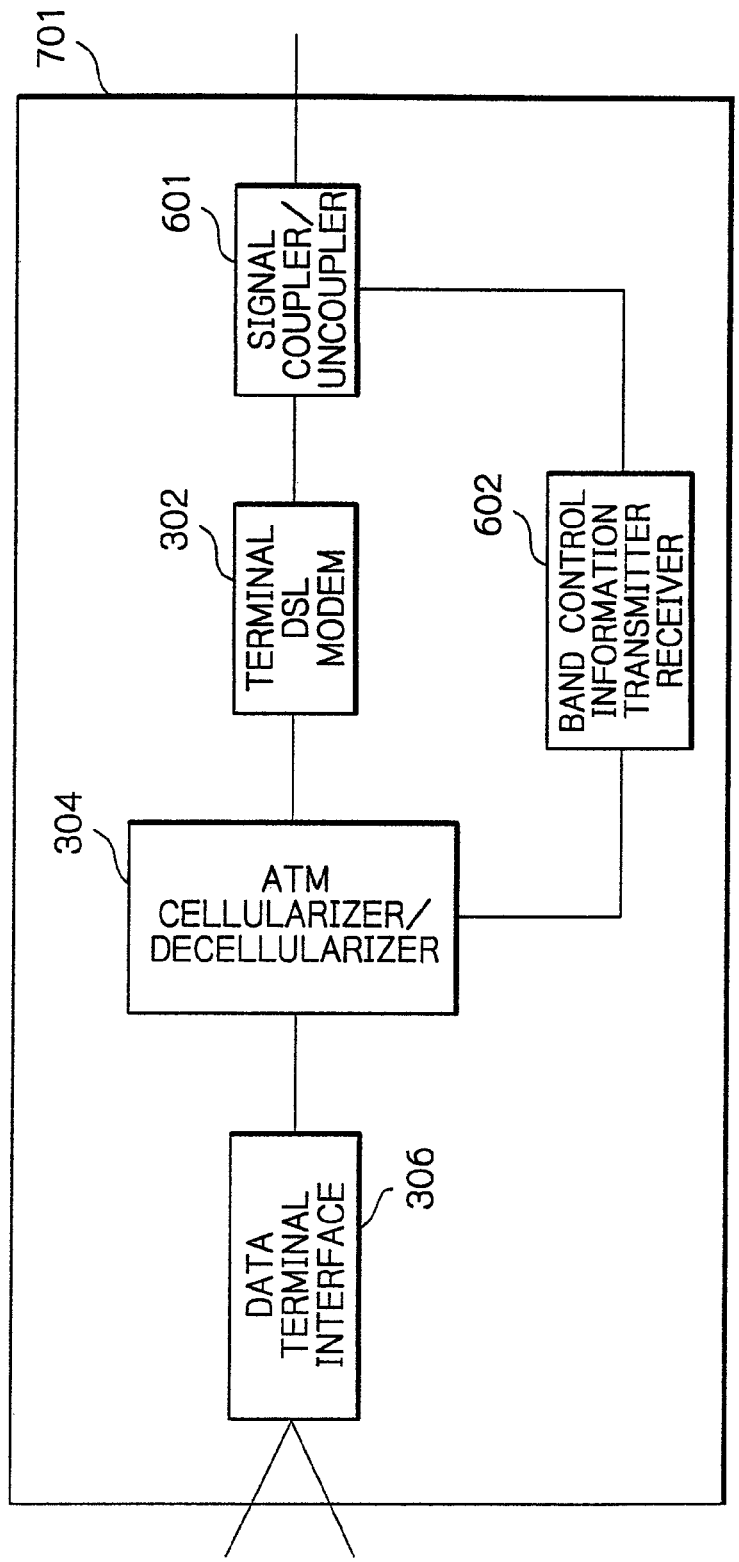
FIG. 10 is a schematic block diagram showing a specific configuration of an ATU-R (Asymmetric digital subscriber line Termination Units-Remote) included in the third embodiment.

FIG. 10 shows a specific configuration of one of the ATU-Rs 701. As shown, the ATU-R 701 includes the band control information transmitter/receiver 602 and signal coupler/uncoupler 601 in addition to the conventional terminal DSL modem 302, ATM cellularizer/decellularizer 304, and data terminal interface 306. How the illustrative embodiment executes bidirectional control over the communication band between the DSLAM 106 and each ATU-R 701 will be described hereinafter.

When the data terminal 109 accommodated in any one of the ATU-Rs effects a data communication service with the IP network 102, signals flow in exactly the same manner as when the data terminal 109 accommodated in the IAD 107 effects a data communication service with the IP network 102.

First, a specific procedure for controlling the communication band directed from the ATU-R 701 toward the DSLAM 106 when a plurality of data communication services are held will be described. In the DSLAM 106 shown in FIG. 6, each band control information transmitter/receiver 502 measures the amount of ATM cells received from the associated ATU-R 701 and present on the associated ATM cell queue 203 or the ratio of discarded ATM cells VC by VC (step S1, FIG. 2). Assume that the amount of ATM cells or the ratio of discarded ATM cells increases above an allowable range assigned to the communication quality of a voice telephone service, which is determined by the provider of the VoDSL network beforehand. Then, the band control information transmitter/receiver 502 modulates the band control information signal to a conventional modem signal or similar signal that can be sent in the frequency band lower than 4 kHz inclusive. The band control information signal is sent to the ATU-R 701 via the signal coupler/uncoupler 501 in order to command the ATU-R 701 to vary the frequency band of the VC on which the data corresponding data communication service is held (step S2, FIG. 2).

In the ATU-R 701 shown in FIG. 10, the band control information signal is routed through the signal coupler/uncoupler 601 to the band control information transmitter/receiver 602. The transmitter/receiver 602 analyzes the communication band designated by the DSLAM 106. The transmitter/receiver 602 then controls the ATM cellularizer/decellularizer 304 in order to narrow the communication band assigned to the VC of the corresponding data communication service and for transmission to the DSLAM 106 (step S3, FIG. 2).

On the other hand, assume that the band control information transmitter/receiver 502 included in the DSLAM 106, FIG. 6, determines that the amount of ATM cells or the ratio of discarded ATM cells has decreased below the allowable range assigned to the communication quality of the voice telephone service. Then, the DSLAM 106 sends the band control information signal to the ATU-R 701 in the previously stated manner. Again, the band control information transmitter/receiver 602 separates the band control information signal and analyzes the communication band designated by the DSLAM 106. The transmitter/receiver 602 then controls the ATM cellularizer/decellularizer 304 in order to broaden the communication band assigned to the VC of the corresponding data communication service and adapted for transmission to the DSLAM 106.

Next, a specific operation for controlling the communication band directed from the DSLAM 106 toward any one of the ATU-Rs 701 will be described. In the ATU-R 701 shown in FIG. 10, each band control information transmitter/receiver 602 measures the amount of ATM cells received from the DSLAM 106 and present in the ATM cellularizer/decellularizer 304 or the ratio of discarded ATM cells VC by VC (step S11, FIG. 8). Assume that the amount of ATM cells or the ratio of discarded ATM cells increases above an allowable range assigned to the communication quality of a voice telephone service, which is determined by the provider of the VoDSL network beforehand. Then, the band control information transmitter/receiver 602 modulates the band control information signal to a conventional modem signal or similar signal that can be sent in the frequency band lower than 4 kHz inclusive. The band control information signal is sent to the DSLAM 106 via the signal coupler/uncoupler 601 in order to command the DSLAM 106 to vary the frequency band of the VC on which the data corresponding data communication service is held (step S12, FIG. 8).

In the DSLAM 106, the band control information signal is routed through the signal coupler/uncoupler 501 to the band control information transmitter/receiver 502. The transmitter/receiver 502 separates the communication band control signal and analyzes the communication band designated by the ATU-R 701. The transmitter/receiver 502 then controls the ATM cell queue 203 in order to narrow the communication band assigned to the VC of the corresponding data communication service and adapted for transmission to the ATU-R 701 (step S13, FIG. 8).

On the other hand, assume that the band control information transmitter/receiver 602 included in the ATU-R 701 determines that the amount of ATM cells or the ratio of discarded ATM cells has decreased below the allowable range assigned to the communication quality of the voice telephone service. Then, the transmitter/receiver 602 sends the band control information signal to the DSLAM 106 in the previously stated manner. Again, the band control information transmitter/receiver 502 in the DSLAM 106 separates the band control information signal and analyzes the communication band designated by the ATU-R 701. The transmitter/receiver 502 then controls the ATM cell queue 203 in order to broaden the communication band assigned to the VC of the corresponding data communication service and adapted for transmission to the ATU-R 701.

As stated above, the illustrative embodiment provides high-quality data communication services by dynamically optimizing the frequency bands between the DSLAM 106 and the ATU-Rs 701 in opposite directions, thereby promoting efficient operation of the DSL subscriber network.

In summary, it will be seen that the present invention obviates uneconomical use of a communication band by preventing it from being pressed. In addition, the present invention provides high-quality data communication services by dynamically optimizing frequency bands between a DSLAM and IADs for thereby promoting efficient operation of a VoDSL network.

Various modifications will become possible for those skilled in the art after receiving the teachings of the present disclosure without departing from the scope thereof.

What is claimed is:

1. A method comprising:
    measuring, by a device, one of:
        an amount of data associated with received data from another device, or
        a ratio of discarded data associated with the received data,
        the received data being transmitted to the device using a particular frequency band;
    transmitting, by the device and to the other device, information to cause the other device to adjust the particular frequency band to an adjusted particular frequency band when the amount of data or the ratio of discarded data exceeds a particular threshold,
        the adjusted particular frequency band being different than the particular frequency band; and
    receiving, by the device and after transmitting the information, additional data from the other device via the adjusted particular frequency band.

2. The method of claim 1, where the received data corresponds to a Voice over Digital Subscriber Line (VoDSL) communication, and
    where the particular threshold relates to a particular communication quality associated with the VoDSL communication.

3. The method of claim 1, where transmitting the information includes:
    transmitting the information via a frequency band that is lower than the particular frequency band.

4. The method of claim 1, where the received data is received via a virtual channel associated with the other device.

5. The method of claim 1, further comprising:
    measuring, for each respective virtual channel of a plurality of virtual channels associated with one or more devices, one of:
        an amount of data associated with data received via the respective virtual channel using a respective frequency band, or
        a ratio of discarded data associated with the data received via the respective virtual channel.

6. The method of claim 5, further comprising:
    transmitting, to the one or more devices, information to adjust the respective frequency band, of one or more virtual channels of the plurality of virtual channels, when the amount of data or the ratio of discarded data, measured for each virtual channel of the one or more virtual channels, exceeds the particular threshold.

7. The method of claim 1, where the received data corresponds to a Voice over Digital Subscriber Line (VoDSL) communication, and
    where transmitting the information includes:
        transmitting the information via a frequency band that is not used to transmit VoDSL communications.

8. A system comprising:
    a device to:
        measure one of:
            an amount of data associated with received data from another device, or
            a ratio of discarded data associated with the received data,
            the received data being transmitted to the device using a particular frequency band; and
        transmit, to the other device, information to cause the other device to adjust the particular frequency band to an adjusted particular frequency band when the amount of data or the ratio of discarded data exceeds a particular threshold,
            the adjusted particular frequency band being different than the particular frequency band.

9. The system of claim 8, where the device is further to:
    receive additional data from the other device via the adjusted particular frequency band.

10. The system of claim 8, where, when transmitting the information, the device is to:
   transmit the information via a frequency band that is lower than the particular frequency band.

11. The system of claim 8, where the received data is received via a virtual channel associated with the other device.

12. The system of claim 8, where the device is further to:
   measure, for each virtual channel of a plurality of virtual channels associated with one or more devices, one of:
      an amount of data associated with data received via the virtual channel using a respective frequency band, or
      a ratio of discarded data associated with the data received via the virtual channel.

13. The system of claim 12, where the device is further to:
   transmit, to the one or more devices, information to adjust the respective frequency band, of one or more virtual channels of the plurality of virtual channels, when the amount of data or the ratio of discarded data, measured for each virtual channel of the one or more virtual channels, exceeds the particular threshold.

14. The system of claim 8, where the received data corresponds to a voice communication, and
   where, when transmitting the information, the device is to:
      transmit the information via a frequency band that is not used to transmit voice communications.

15. A device comprising:
   a plurality of components to:
      determine whether one of:
         an amount of data, associated with received data from another device, exceeds a particular threshold, or
         a ratio of discarded data, associated with the received data, exceeds the particular threshold,
         the received data being transmitted to the device using a particular frequency band; and
      transmit, to the other device, information to cause the other device to adjust the particular frequency band to an adjusted particular frequency band when the amount of data exceeds the particular threshold or the ratio of discarded data exceeds the particular threshold,
         the adjusted particular frequency band being different than the particular frequency band.

16. The device of claim 15, where the plurality of components are further to:
   receive additional data from the other device via the adjusted particular frequency band.

17. The device of claim 15, where the received data corresponds to a voice communication, and
   where, when transmitting the information, the plurality of components are to:
      transmit the information via a frequency band that is not used to transmit voice communications,
         the frequency band being lower than the particular frequency band.

18. The device of claim 15, where the device includes Digital Subscriber Line Access Multiplexer (DSLAM), and
   the other device includes an Integrated Access Device.

19. The device of claim 15, where the received data corresponds to a Voice over Digital Subscriber Line (VoDSL) communication, and
   where the particular threshold relates to a particular communication quality associated with the VoDSL communication.

20. The device of claim 15, where the plurality of components are further to:
   measure, for each virtual channel of a plurality of virtual channels associated with one or more devices, one of:
      an amount of data associated with data received via the virtual channel using a respective frequency band, or
      a ratio of discarded data associated with the data received via the virtual channel; and
   transmit, to the one or more devices, information to adjust the respective frequency band, of one or more virtual channels of the plurality of virtual channels, when the amount of data or the ratio of discarded data, measured for each virtual channel of the one or more virtual channels, exceeds the particular threshold.

* * * * *